(12) United States Patent
Naffziger et al.

(10) Patent No.: US 9,170,631 B2
(45) Date of Patent: Oct. 27, 2015

(54) ADAPTIVE TEMPERATURE AND POWER CALCULATION FOR INTEGRATED CIRCUITS

(71) Applicant: Advanced Micro Devices, Inc., Sunnyvale, CA (US)

(72) Inventors: Samuel Naffziger, Fort Collins, CO (US); Bao-min Liu, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 326 days.

(21) Appl. No.: 13/759,611

(22) Filed: Feb. 5, 2013

(65) Prior Publication Data

US 2014/0223199 A1    Aug. 7, 2014

(51) Int. Cl.
*G06F 1/00* (2006.01)
*G06F 1/32* (2006.01)

(52) U.S. Cl.
CPC .............. *G06F 1/3206* (2013.01); *G06F 1/324* (2013.01); *G06F 1/3296* (2013.01)

(58) Field of Classification Search
CPC ...... G06F 1/3206; G06F 1/324; G06F 1/3296
USPC ................ 713/300, 500, 1; 327/538; 718/104
See application file for complete search history.

(56) References Cited

U.S. PATENT DOCUMENTS

| | | | | |
|---|---|---|---|---|
| 7,814,489 | B2 * | 10/2010 | Uemura et al. | 718/103 |
| 2005/0278520 | A1 * | 12/2005 | Hirai et al. | 713/1 |
| 2007/0143763 | A1 * | 6/2007 | Adachi et al. | 718/104 |
| 2007/0174642 | A1 * | 7/2007 | Cornwell et al. | 713/300 |
| 2007/0255972 | A1 * | 11/2007 | Gaskins et al. | 713/500 |
| 2009/0224601 | A1 * | 9/2009 | Ito | 307/31 |
| 2011/0291746 | A1 * | 12/2011 | Ibrahim et al. | 327/538 |
| 2014/0149752 | A1 * | 5/2014 | Brock et al. | 713/300 |

* cited by examiner

*Primary Examiner* — Thomas Lee
*Assistant Examiner* — Aurel Prifti

(57) ABSTRACT

Methods, apparatus, and fabrication processes relating to thermal calculations of an integrated circuit device are reported. The methods may comprise determining a power consumption by a power entity of an integrated circuit, the power entity comprising at least one functional element of the integrated circuit; determining a temperature of a thermal entity, the thermal entity comprising a subset of the power entity; and adjusting at least one of a voltage or an operating frequency of at least one functional element of the power entity, based upon the temperature of the thermal entity being greater than or equal to a predetermined threshold temperature for the thermal entity.

16 Claims, 3 Drawing Sheets

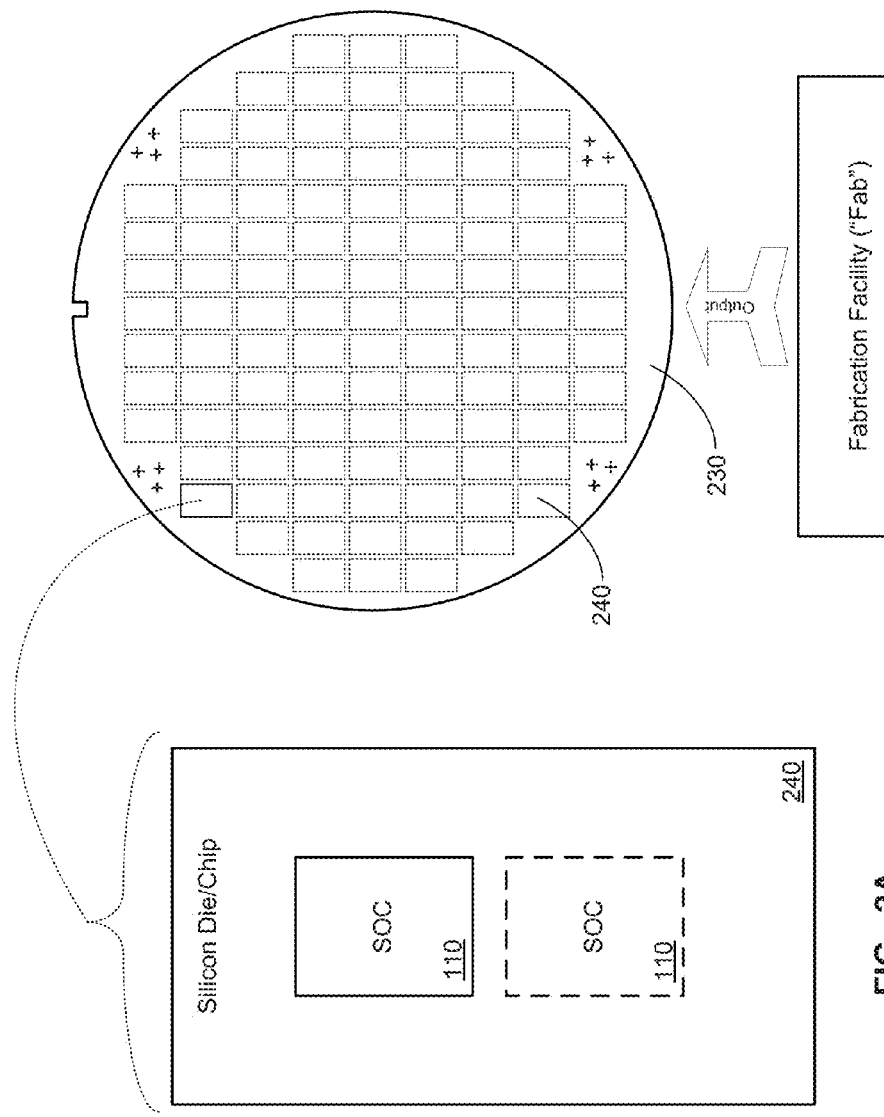

ADAPTIVE TEMPERATURE AND POWER CALCULATION FOR INTEGRATED CIRCUITS

BACKGROUND

1. Technical Field

Generally, the present disclosure relates to integrated circuits, and, more particularly, to adaptive temperature and power management of system-on-chip components.

2. Description of the Related Art

System-on-chip (SOC) approaches are commonly used in the art. SOCs comprise a plurality of components each of which requires power and generates heat. The temperature of each component at any given time depends on its power consumption at that time, as well as cross heating from nearby components. It is highly desirable to keep the temperature of each component temperature within a specified range, in order to maintain stable long term performance. In view of this, real-time calculation of temperature for an SOC has become an essential aspect of power management for SOCs. This calculation uses power information collected during normal operation from various functional elements of the SOC to estimate the dynamic temperature of each functional element in a central micro-controller. For this calculation, the SOC is considered as a plurality of thermal entities (TE for short), wherein a TE is the basic unit of temperature analysis. To perform a real time temperature calculation for an area of the SOC, a central micro-controller known in the art needs the power consumption of the area of the SOC and the thermal transfer coefficients from the area to each other area of the SOC. In other words, in the art, the area of the SOC from which power consumption data is collected is the same as the area of the SOC for which thermal transfer coefficients to each other area are determined.

For accuracy of a temperature calculation at a fine grained level, a TE may be defined for each functional element with a minimum or greater power consumption. However, doing so may cause the definition of a large number of TEs, i.e., about one per functional element. Because a real time temperature calculation at the level of one TE per functional element requires both the power consumption of each functional element and the thermal transfer coefficients between every pair of functional elements, and the number of pairs of functional elements is a triangular number based on the number of functional elements (e.g., for 2, 3, 4, 5, 6 . . . functional elements, there are 1, 3, 6, 10, 15 . . . pairs), a large increase in the number of TEs incurs excessive resources to implement and execute real time temperature calculations.

SUMMARY OF EMBODIMENTS OF THE DISCLOSURE

The apparatus, systems, and methods in accordance with the embodiments of the present disclosure may mitigate the resource requirements for real time temperature calculations in systems comprising a plurality of thermal entities. They may do so by allowing optimization of TE geometry, which may result in accurate capture of hot spot temperatures within a SOC with relatively low resource requirements. Generally, the optimization may involve an area of the SOC for which thermal transfer coefficients are calculated (hereinafter, a "thermal entity") being a subset of an area of the SOC from which power consumption data may be collected (a "power entity"). This is in contrast to the art, where what we have termed a "power entity" and a "thermal entity" are the same area. Mechanisms controlling optimization of thermal entity geometry and/or calculating real time temperatures in systems with improved TE geometry may be formed within a microcircuit by any means, such as by growing or deposition.

One apparatus in accordance with some embodiments of the present disclosure includes: at least one power entity comprising at least one functional element of the integrated circuit; at least one thermal entity comprising a subset of the power entity; and a processor configured to: determine a power consumption by each functional element of the power entity; determine a temperature of each thermal entity; and adjust at least one of a voltage or an operating frequency of at least one functional element of the at least one power entity, based upon the temperature of the thermal entity contained in the power entity being greater than or equal to a predetermined threshold temperature for the thermal entity.

One method in accordance with some embodiments of the present disclosure comprises determining a power consumption by a power entity of an integrated circuit, the power entity comprising at least one functional element of the integrated circuit; determining a temperature of a thermal entity, the thermal entity comprising a subset of the power entity; and adjusting at least one of a voltage or an operating frequency of at least one functional element of the power entity, based upon the temperature of the thermal entity being greater than or equal to a predetermined threshold temperature for the thermal entity.

Some embodiments described herein may be used in any type of integrated circuit that manages power consumption and/or heat generation by one or more components of the integrated circuit. One example is a general purpose microprocessor.

BRIEF DESCRIPTION OF THE FIGURES

The particular embodiments disclosed will hereafter be described with reference to the accompanying drawings, wherein like reference numerals denote like elements, and:

FIG. 2A provides a representation of a silicon die/chip that includes one or more systems-on-chip as shown in FIG. 1, in accordance with some embodiments of the disclosure.

FIG. 2B provides a representation of a silicon wafer which includes one or more dies/chips that may be produced in a fabrication facility, in accordance with some embodiments of the disclosure.

Figure 1:
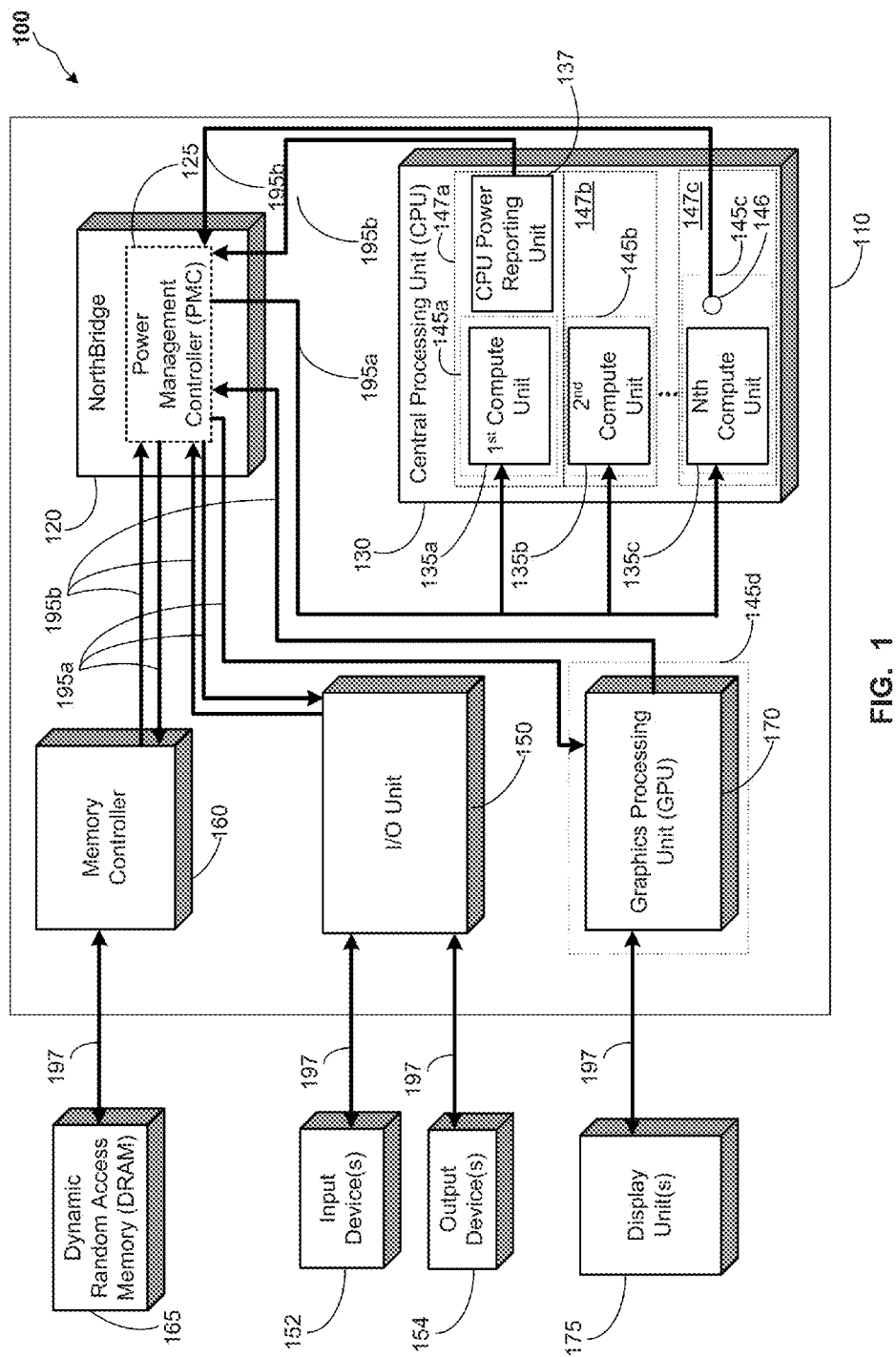
FIG. 1 is a simplified schematic diagram of a microcircuit design, in accordance with some embodiments of the disclosure.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

Some embodiments of the present disclosure provide for dynamic adjustment of power consumption of components of an integrated circuit to minimize temperatures calculated or observed at various locations in the integrated circuit.

Turning now to FIG. 1, a block diagram, a stylized representation of a computer system 100, comprising a system-on-chip (SOC) 110, is illustrated. The SOC 110 may comprise a northbridge 120. The northbridge 120 may perform various operations known the person of ordinary skill in the art. Among its various components (not shown), the northbridge 120 may comprise a power management controller (PMC) 125. The PMC 125 may be configured to issue power management directives to other components of the SOC 110 via data channels 195a, and receive power reports from other components of the SOC 110 via data channels 195b. In some embodiments, the PMC 125 may be configured to calculate and/or observe thermal activity at various portions of the SOC 110. Those various portions, herein "thermal entities," will be discussed in more detail below. In some embodiments, the PMC 125 may issue power management directives based on calculated and/or observed thermal activity.

The SOC 110 may comprise a central processing unit (CPU) 130. The CPU 130 may comprise a plurality of compute units 135, such as a first compute unit 135a, a second compute unit 135b, through an Nth compute unit 135c. In some embodiments, a compute unit 135a, 135b, or 135c may be referred to as a "CPU core." The CPU 130 may also comprise a CPU power reporting unit 137. The CPU power reporting unit 137 may send power reports relating to the CPU 130 to the PMC 125 via a data channel 195b. Each of the compute units 135 may receive power management directives from the PMC 125 via a data channel 195a.

The SOC 110 may also comprise other components, such as an I/O unit 150 configured to receive user input from input devices 152 (e.g., keyboards, mice, trackballs, touchpads, touchscreens, microphones, etc.) and send output to output devices 154 (e.g., speakers, headphones, etc.) via data channels 197. The I/O unit 150 and/or subcomponents thereof may receive power management directives from the PMC 125 via a data channel 195a and may send power reports to the PMC 125 via a data channel 195b.

The SOC 110 may also comprise a memory controller 160 configured to send and receive data to a memory, such as a dynamic random access memory (DRAM) 165, via a data channel 197. The memory controller 160 and/or subcomponents thereof may receive power management directives from the PMC 125 via a data channel 195a and may send power reports to the PMC 125 via a data channel 195b.

The SOC 110 may also comprise a graphics processing unit (GPU) 160 configured to send output to display unit(s) 175 via a data channel 197. The GPU 160 and/or subcomponents thereof may receive power management directives from the PMC 125 via a data channel 195a and may send power reports to the PMC 125 via a data channel 195b. In particular embodiments (not shown), the GPU 160 may comprise one or more GPU cores, similar to the compute units 135 shown in the CPU 130.

The SOC 110 may comprise at least one power entity, such as power entity 147a (dashed line). A "power entity" is an abstract element, comprising at least one, and typically multiple functional elements of the SOC 110 (e.g., one or more of compute units 135, GPU 170, northbridge 120, etc.). As shown, power entity 147a comprises first compute unit 135a and CPU power reporting unit 137; power entity 147b comprises second compute unit 135b; and power entity 147c comprises Nth compute unit 135c. Each power entity may comprise other functional elements (not shown).

The SOC 110 may also comprise at least one thermal entity (e.g., thermal entities 145a, 145b, and 145c (dotted lines), such that each power entity comprises a thermal entity. A thermal entity 145 may comprises a functional element of the SOC 110. For example, in the depicted embodiment, first thermal entity 145a comprises first compute unit 135a; second thermal entity 145b comprises second compute unit 135b; third thermal entity 145c comprises third compute unit 135c; and fourth thermal entity 145d comprises GPU 170. In alternative and/or additional embodiments (not shown), a thermal entity 145 may comprise a plurality of functional elements (not shown). Generally, it is desirable for a thermal entity 145 to comprise one highly-active and highly-energy-consumptive element, such as a CPU 130, a CPU core 135, a GPU 170, a GPU core (not shown), an APU or APU core (not shown), a functional unit of one of the foregoing, or a cache of one of the foregoing.

In other words, a power entity 147 comprises a set of functional elements for which power may be calculated and/or measured; and a thermal entity 145 comprises a set of functional elements for which temperature may be calculated and/or measured.

In some embodiments, a power entity may comprise a plurality of functional elements and a thermal entity may comprise a single functional element. E.g., power entity 147a (which comprises thermal entity 145a) may comprise CPU power reporting unit 137 and first compute unit 135a, and thermal entity 135a may comprise first compute unit 135a.

The SOC 110 may also comprise at least one temperature sensor 146. Typically, a temperature sensor 146 may be located in proximity to highly-active and highly-energy-consumptive element, such as a CPU 130, a CPU core 135, a GPU 170, or a GPU core (not shown). A thermal entity, such as third thermal entity 145c, comprise a temperature sensor 146. As should be apparent, a temperature sensor 146 is not a "functional element" as used herein. The temperature sensor 146 may provide information that PMC 125 may use in determining power management directives to issue to various elements of SOC 110.

Although the embodiments described above refer to SOC 110, power and thermal entities may be defined for other electronic devices, e.g., computer systems, computer platforms, etc.

Turning now to FIG. 2A, in some embodiments, the SOC 110 of the integrated circuit device may reside on a silicon die/chip 240. The silicon die/chip 240 may be housed on a motherboard or other structure of a computer system. In one or more embodiments, there may be more than one SOC 110 on each silicon die/chip 240. Various embodiments of the SOC 110 may be used in a wide variety of electronic devices.

Turning now to FIG. 2B, in accordance with some embodiments, and as described above, the SOC 110 may be included on the silicon chip/die 240. The silicon chip/die 240 may contain one or more different configurations of the SOC 110. The silicon chip/die 240 may be produced on a silicon wafer 230 in a fabrication facility (or "fab") 290. That is, the silicon wafer 230 and the silicon die/chip 240 may be referred to as the output, or product of, the fab 290. The silicon chip/die 240 may be used in electronic devices.

The circuits described herein may be formed on a semiconductor material by any known means in the art. Forming can be done, for example, by growing or deposition, or by any other means known in the art. Different kinds of hardware descriptive languages (HDL) may be used in the process of designing and manufacturing the microcircuit devices. Examples include VHDL and Verilog/Verilog-XL. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units, RAMs, compact discs, DVDs, solid state storage and the like) and, in one embodiment, may be used to configure a manufacturing facility (e.g., through the use of mask works) to create devices capable of embodying various aspects of the instant disclosure. As understood by one or ordinary skill in the art, it may be programmed into a computer, processor, or controller, which may then control, in whole or part, the operation of a semiconductor manufacturing facility (or fab) to create semiconductor products and devices. These tools may be used to construct the embodiments of the disclosure described herein.

Figure 3:
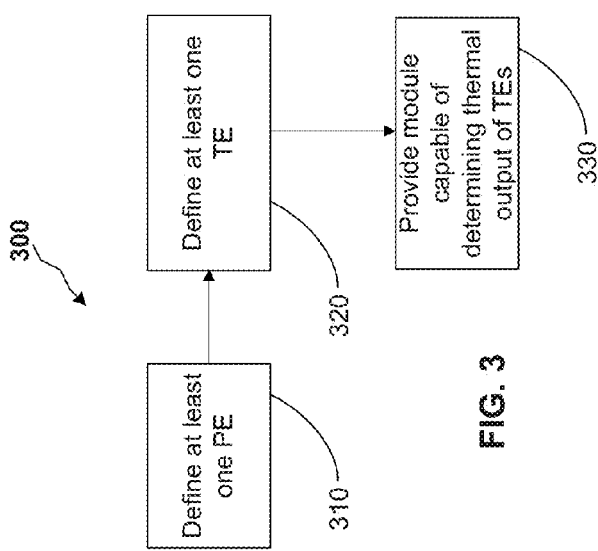
FIG. 3 is a flowchart of a method relating to defining thermal entities of an integrated circuit, in accordance with some embodiments of the disclosure.

FIG. 3 presents a flowchart depicting a method 300 according to some embodiments of the present disclosure. The method 300 may comprise defining at 310 at least one power entity of an integrated circuit design, wherein each power entity comprises at least one functional element of the integrated circuit design.

The method 300 may comprise defining at 320 at least one thermal entity of the integrated circuit design, wherein each thermal entity comprises a functional element of the integrated circuit design and each power entity comprises a thermal entity. In some embodiments, each first thermal entity may comprise a CPU, a core of a CPU, a GPU, a core of a GPU, an APU, a core of an APU, a functional unit of one of the foregoing, or a cache of one of the foregoing. In some embodiments, each first thermal entity may comprise a core of a CPU. In some embodiments, each first thermal entity may comprise at least one temperature sensor.

The method 300 may comprise providing at 330 providing a module capable of determining the thermal output of the at least one thermal entity, based at least in part on one or more of power consumed by functional elements of the power entity, a coefficient of thermal transfer from the thermal entity to each other thermal entity, or both the power consumed by functional elements of the power entity and the coefficient of thermal transfer from the thermal entity to each other thermal entity.

The method 300 may be used as part of a process of developing a thermal model for integrated-circuit level real time temperature calculation. Generally, such a process may involve the following operations. First, the floor plan of the integrated circuit (e.g., a CPU, a GPU, an APU, or the like, among others) is provided. The product package and thermal solution information, including thermal design power (TDP) and worst ambient conditions are also provided. From the provided information, power calculations may be performed and a detailed power profile may be generated, such as by the use of known software packages and/or techniques. A three-dimensional detailed thermal model may then be created using the floorplan and detailed power distribution. The thermal model may then be solved for the detailed thermal profile and the temperatures at the locations of various sensors located on the integrated circuit (IC) may be extracted. From this, a first set of sub-IC thermal entities (TEs) in the thermal model may be established based on the sensor locations. A thermal entity's power may then be assigned based on power Cac definitions of the IC.

Continuing, the process may also involve solving the sub-IC TE level thermal model to yield TE temperatures. The sub-IC TE temperatures may be compared to the sensor location temperatures obtained above.

If the TE temperatures agree poorly, or not at all, with the sensor location temperatures the sub-IC TE geometries may be adjusted to more closely correspond to the locations of the sensors. In some embodiments, the TE geometries may be adjusted such that one or more sensors are closer to the center of a TE. The sub-IC thermal model may then be solved, the comparison to sensor location temperatures performed, and the sub-IC TE geometries adjusted until a good agreement is achieved between the TE temperatures and the sensor location temperatures.

Once the TE temperatures agree well with sensor location temperatures, a thermal RC thermal model may be generated based on the optimized Sub-IC TE model. The RC thermal model may be implemented for hybrid sensing and/or performance boost.

Figure 4:
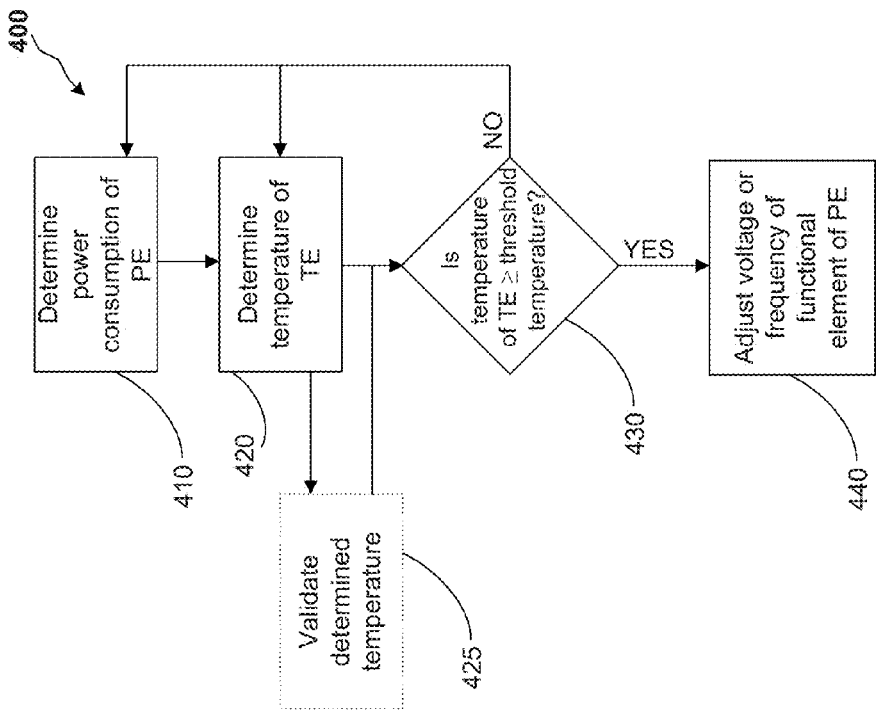
FIG. 4 is a flowchart of a method relating to adjusting the voltage and/or operating frequency of elements of an integrated circuit, in accordance with some embodiments of the disclosure.

FIG. 4 presents a flowchart depicting a method 400 according to some embodiments of the present disclosure. In the depicted embodiment, the method 400 may comprise determining at 410 a power consumption by a power entity of an integrated circuit, the power entity comprising at least one functional element of the integrated circuit.

The method 400 may further comprise determining at 420 determining a temperature of a thermal entity, the thermal entity comprising a subset of the power entity.

In some embodiments, determining the temperature at 420 may be based at least in part on the power consumption of functional elements of the power entity. Alternatively or in addition, in some embodiments, determining the temperature at 420 may be based at least in part on a coefficient of thermal transfer from the thermal entity to each other thermal entity of the integrated circuit or other device. In some embodiments, determined the temperature at 420 may be based on both.

In other words, some functional elements contained by a power entity but not contained by a thermal entity (e.g., CPU power reporting unit 137, FIG. 1), may have their power consumption taken into consideration for calculating the temperature of a nearby thermal entity without their own temperature being calculated. If the functional element not contained by the thermal entity is not expected to encounter an undesirably high temperature, then not calculating its temperature from power consumption may reduce thermal calculation time and complexity.

In some embodiments, each thermal entity comprises a core of a CPU, a core of a GPU, or a core of an APU, a functional unit of one of the foregoing, or a cache of one of the foregoing. In some further embodiments, each thermal entity comprises a core of a CPU.

In some embodiments, the method 400 may further comprise validating at 425 the determined temperature of at least one thermal entity, wherein the thermal entity comprises at least one temperature sensor.

A determination may be made at 430 as to whether the temperature of the at least one thermal entity is greater than or equal to a threshold temperature for the thermal entity. If it is (e.g., if the thermal entity has an undesirably high temperature), the method 400 may comprise adjusting at 440 at least one of a voltage or an operating frequency of at least one functional element of the power entity comprising the thermal entity. By reducing power consumption of the functional element(s), the temperature of the thermal entity may be lowered.

If the temperature of the thermal entity is below the threshold temperature, flow may return to determining at 420, if the temperature of another thermal entity has not been, and still needs to be, determined, or to determining at 410, if the temperatures of all thermal entities have been determined.

The methods illustrated in FIGS. 3-4 may be governed by instructions that are stored in a non-transitory computer readable storage medium and that are executed by at least one processor of the computer system 100. Each of the operations shown in FIGS. 3-4 may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A method, comprising:
   determining a power consumption by a power entity of an integrated circuit, the power entity comprising at least one functional element of the integrated circuit;
   determining a temperature of a thermal entity, the thermal entity comprising a subset of the power entity, wherein the temperature of the thermal entity is determined based at least in part on a coefficient of thermal transfer from the thermal entity to each other thermal entity of the integrated circuit and further based at least in part on power consumption of functional elements of the power entity; and
   adjusting at least one of a voltage or an operating frequency of at least one functional element of the power entity, based upon the temperature of the thermal entity being greater than or equal to a predetermined threshold temperature for the thermal entity.

2. The method of claim 1, further comprising:
   validating the determined temperature of the thermal entity, using at least one temperature sensor.

3. The method of claim 1, wherein the thermal entity comprises a core of a CPU, a core of a GPU, or a core of an APU, a functional unit of one of the foregoing, or a cache of one of the foregoing.

4. The method of claim 3, wherein each thermal entity comprises a core of a CPU.

5. An integrated circuit device, comprising:
   at least one power entity comprising at least one functional element of the integrated circuit;
   at least one thermal entity comprising a subset of the power entity; and
   a processor configured to:
   determine a power consumption by each functional element of the power entity;
   determine a temperature of each thermal entity based at least based at least in part on a coefficient of the thermal transfer from the thermal entity to each other thermal entity of the integrated circuit and further based at least in part on power consumption of functional elements of the power entity; and
   adjust at least one of a voltage or an operating frequency of at least one functional element of the at least one power entity, based upon the temperature of the thermal entity contained in the power entity being greater than or equal to a predetermined threshold temperature for the thermal entity.

6. The integrated circuit device of claim 5, wherein the processor further is to validate the determined temperature of the thermal entity using at least one temperature sensor.

7. The integrated circuit device of claim 6, wherein each temperature sensor is located in a thermal entity.

8. The integrated circuit device of claim 7, wherein each thermal entity comprises at least one temperature sensor.

9. The integrated circuit device of claim 5, wherein each thermal entity comprises a core of a CPU, a core of a GPU, or a core of an APU, a functional unit of one of the foregoing, or a cache of one of the foregoing.

10. The integrated circuit device of claim 9, wherein each thermal entity comprises a core of a CPU.

11. A non-transitory computer readable storage medium encoded with data that, when implemented in a manufacturing facility, adapts the manufacturing facility to fabricate an integrated circuit device, comprising:
    at least one power entity comprising at least one functional element of the integrated circuit;
    at least one thermal entity comprising a subset of the power entity; and
    a processor configured to:
    determine a power consumption by each functional element of the power entity; determine a temperature of each thermal entity based at least in part on a coefficient of the thermal transfer from the thermal entity to each other thermal entity of the integrated circuit and further based at least in part on power consumption of functional elements of the power entity; and
    adjust at least one of a voltage or an operating frequency of at least one functional element of the at least one power entity, based upon the temperature of the thermal entity contained in the power entity being greater than or equal to a predetermined threshold temperature for the thermal entity.

12. The non-transitory computer readable storage medium of claim 11, wherein the processor further is to validate the determined temperature of the thermal entity using at least one temperature sensor.

13. The non-transitory computer readable storage medium of claim 12, wherein each of temperature sensor is located in a thermal entity.

14. The non-transitory computer readable storage medium of claim 13, wherein each thermal entity comprises at least one temperature sensor.

15. The non-transitory computer readable storage medium of claim 11, wherein each thermal entity comprises a core of a CPU, a core of a GPU, or a core of an APU, a functional unit of one of the foregoing, or a cache of one of the foregoing.

16. The non-transitory computer readable storage medium of claim 15, wherein each thermal entity comprises a core of a CPU.

* * * * *